(12) United States Patent
Minshall

(10) Patent No.: US 6,577,699 B1
(45) Date of Patent: Jun. 10, 2003

(54) CONTAINER FOR NUCLEAR FUEL ELEMENTS

(75) Inventor: David Minshall, Risley Warrington (GB)

(73) Assignee: British Nuclear Fuels, plc, Cheshire (GB)

( * ) Notice: Subject to any disclaimer, the term of this patent is extended or adjusted under 35 U.S.C. 154(b) by 0 days.

(21) Appl. No.: 09/979,650

(22) PCT Filed: Apr. 28, 2000

(86) PCT No.: PCT/GB00/01642

§ 371 (c)(1),
(2), (4) Date: Nov. 21, 2001

(87) PCT Pub. No.: WO00/72325

PCT Pub. Date: Nov. 30, 2000

(30) Foreign Application Priority Data

May 24, 1999 (GB) .............................................. 9911979

(51) Int. Cl.$^7$ .............................................. G21C 19/06
(52) U.S. Cl. ...................... 376/272; 250/507.1; 220/691
(58) Field of Search ....................... 376/272; 250/506.1, 250/507.1, 515.1, 518.1; 220/4.33, 4.34, 551, 552, 690, 691

(56) References Cited

U.S. PATENT DOCUMENTS

| 3,591,212 A | * | 7/1971 | Rhyne .......................... 217/65 |
| 3,692,201 A | * | 9/1972 | Garduna .................... 217/12 R |
| 4,002,261 A | * | 1/1977 | Litchfield .................. 220/4.33 |
| 4,331,244 A |   | 5/1982 | Davis, Jr. |
| 4,815,624 A |   | 3/1989 | Houghton |
| 5,816,425 A | * | 10/1998 | Keip et al. .................. 220/4.31 |
| 5,938,059 A | * | 8/1999 | Luburic ...................... 220/4.32 |
| 6,064,709 A | * | 5/2000 | Robert et al. ................ 376/261 |
| 6,118,838 A | * | 9/2000 | Robert et al. ............. 250/506.1 |

FOREIGN PATENT DOCUMENTS

| EP | 0 080 894 A2 | 6/1983 |
| EP | 158 849 A1 | 10/1985 |
| EP | 0 858 079 A1 | 8/1998 |
| EP | 0 883 135 A1 | 12/1998 |
| EP | 0 947 434 A2 | 10/1999 |
| FR | 2 680 909 A1 | 3/1993 |
| GB | 2 110 152 A | 6/1983 |
| GB | 2 177 962 A | 1/1987 |
| JP | 05 80188 A | 4/1993 |
| JP | 08 62379 A | 3/1996 |
| NL | 8 400 864 | 10/1985 |

* cited by examiner

Primary Examiner—Michael J. Carone
Assistant Examiner—Daniel Matz
(74) Attorney, Agent, or Firm—Carr Law Firm, L.L.P.

(57) ABSTRACT

According to the present invention there is provided a container for the storage and transport of nuclear fuel elements comprising a plurality of elongate compartments for receiving the nuclear fuel elements, the compartments being defined by a first set of plates intersecting with a second set of plates, the first set of plates extending perpendicularly with respect to the second set of plates to define compartments having a rectangular cross section, wherein the plates include an interlocking joint, the interlocking joint comprising at least one projection provided on one plate and a recess formed in the other plate, and wherein a retaining portion is provided in the recess for engagement by the projection so as to interlock the plates.

30 Claims, 5 Drawing Sheets

CONTAINER FOR NUCLEAR FUEL ELEMENTS

This application is a national stage application filed under 35 U.S.C. 371, claiming priority to International Application No. PCT/GB00/01642 filed on Apr. 28, 2000, which claims priority to UK Patent Application No. 9911979.4 filed on May 24, 1999.

FIELD OF THE INVENTION

The present invention relates to containers and, in particular, to containers for the storage and/or transport of nuclear fuel elements.

BACKGROUND OF THE INVENTION

Typically, nuclear fuel elements may be stored and/or transported in containers in the form of casks, racks for in-pond storage of spent nuclear fuel elements, flasks and multi-element bottles. These containers generally comprise an elongate body incorporating a plurality of compartments of rectangular cross section, each of which can accommodate a fuel element. The compartments are formed from elongate plates, which intersect one another at right angles to define a cellular grid structure.

A problem encountered in the construction of such containers concerns the joining together of the plates along their longitudinal edges. One method of joining the plates is to weld the plates together. However, this method has certain disadvantages. For example, the plates are usually made from materials such as stainless steel or boron steel which are extremely difficult to weld. Furthermore, the welding material used to form fillet welds occupies space within the compartments so that the passage of a fuel element along a compartment may be obstructed. A further disadvantage is that plates joined together by welds are prone to distortion due to the intense heat generated during the welding process. A combination of interlinked plates of different sets secured against disassembly by welding is disclosed in EP-A-0 883 135 (A.T.E.A.).

It is an object of this invention to provide a container for nuclear fuel elements in which the plates forming the compartments are joined together in such a manner as to overcome the aforementioned disadvantages.

SUMMARY OF THE INVENTION

According to the present invention there is provided a container for the storage and transport of nuclear fuel elements comprises a plurality of elongate compartments for receiving the nuclear fuel elements, the compartments being defined by a first set of plates intersecting with a second set of plates, the first set of plates extending perpendicularly with respect to the second of plates to define compartments having a rectangular cross section, characterised in that the plates include an interlocking joint, the interlocking joint comprising at least one projection provided on one plate of one set and a recess formed in the other plate of the same set, and wherein a retaining portion is provided in the recess for engagement by the projection so as to interlock the plates.

Preferably, the plates in the first set are interconnected by an interlocking joint comprising a plurality of projections spaced along a longitudinal edge of one of the plates and a plurality of recesses spaced along a longitudinal edge of the other plate.

The projection may comprise a first portion extending forwardly from the longitudinal edge of the said one of the plates and an arm portion extending laterally from an end of the first portion, and wherein the arm portion engages with the retaining portion in the recess.

Preferably, an arm portion extends from each side of the first portion, the recess having two retaining portions, each of which is engaged by an arm portion.

The first portion and each arm portion may define a substantially T-shaped projection and wherein the recess is correspondingly T-shaped.

Each arm portion may be formed by a deflectable tab extending rearwardly and outwardly from an end of the first portion, the tabs being deflected inwardly as the projection is pushed into the recess, the tabs tending to resume their undeflected positions when the projection is located in the recess. Suitably, the recess has a first passage region extending into an enlarged region, the junction of the first passage region and the enlarged region defining the retaining means.

At an intersection of the first and second set of plates the recess may be provided in a plate of the second set.

Suitably, at an intersection of the first and second set of plates at least one tenon projects from each of the mutually facing longitudinal edges of the plates of the second set, the tenons extending into a slot provided in the plate of the first set.

The tenons projecting from each of the mutually facing longitudinal edges of the plates of the second set are preferably received by the same slot.

Preferably, the tenons on each of the longitudinal edges are provided with interengaging latch portions.

The profiles of the projections and recesses forming the interlocking joints can be formed by any suitable metal cutting operation. However, it has been found that the most suitable method is a laser cutting technique. This technique enables the interlocking joints to be produced with the required dimensional accuracy.

It has been found that the interlocking joints according to the invention provides the container the ability to withstand static and dynamic loads. The resilience of the joints enables the container to absorb energy resulting from impacts.

Construction of the container in accordance with the present invention enables the components to be transported conveniently as so-called "flat packs". Container assembly can be carried on site by unskilled labour.

The absence of weld material within the compartments ensures that there is an increased amount of space for accommodating the fuel elements. Furthermore, there are no obstructions within the compartments to hinder insertion of the fuel elements. Since no heat is required for assembly the plates, in contrast to a welded assembly, the plates are not prone to distortion.

The plate defining the compartments may have a thickness in the order of 5 mm. If the containers are required to accommodate spent nuclear fuel elements, the material for the plates should be a suitable neutron poison. Typically, the material may be a stainless steel or a boron steel.

BRIEF DESCRIPTION OF THE DRAWINGS

The invention will now be described, by way of example, with reference to the accompanying drawings, in which.

DETAILED DESCRIPTION OF THE INVENTION

Figure 1:
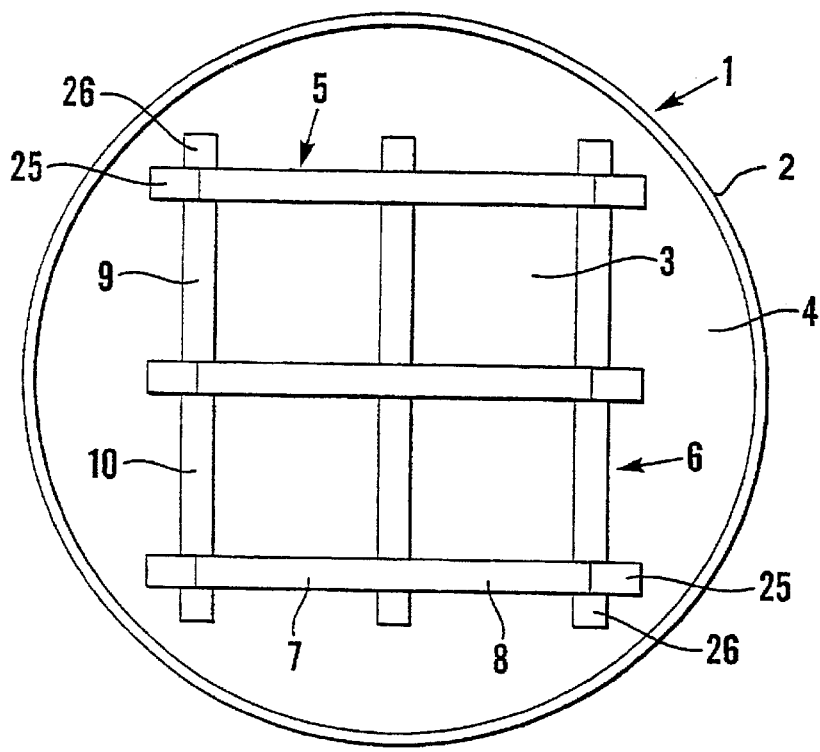
FIG. 1 is a diagrammatic end elevation of a container having compartments for accommodating nuclear fuel elements according to one aspect of the invention.
Figure 5:
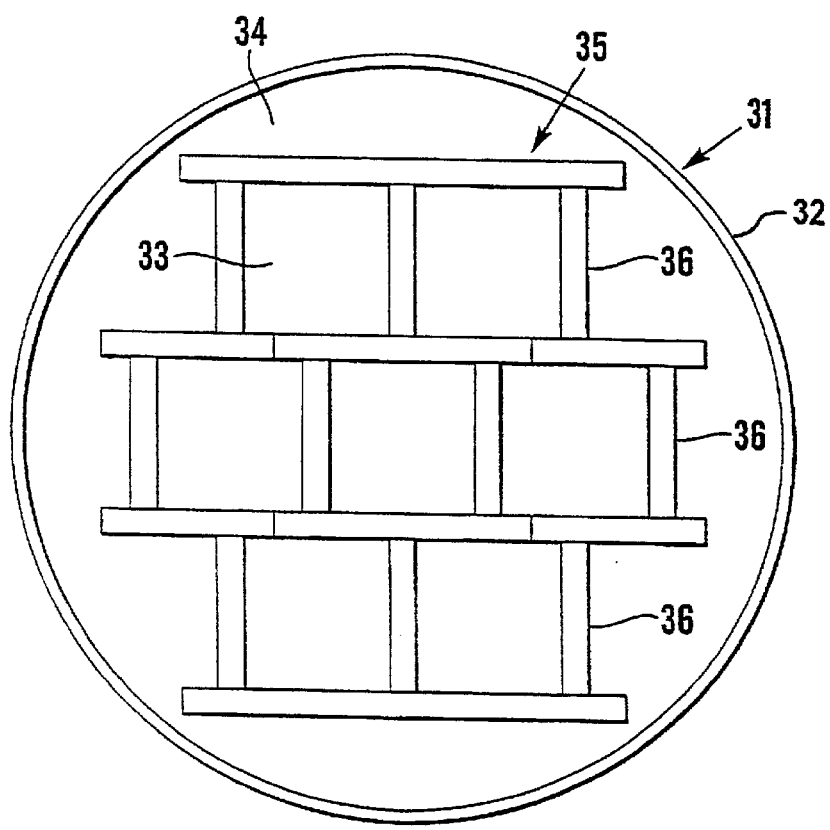
FIG. 5 is a diagrammatic end elevation of a container having compartments for accommodating nuclear fuel elements according to a second aspect of the invention.

Referring to FIG. 1, a typical container 1 for receiving nuclear fuel elements (not shown) comprises an elongate cylindrical casing 2 within which is housed a plurality of compartments 3. The compartments 3 are located within the casing 2 by a plurality of baffle plates 4 positioned at intervals along the container 1.

The compartments 3 are of rectangular cross section and are formed by two sets of elongate plates 5, 6. A first set of plates 5 extends perpendicularly with respect to the second set of plates 6 so as to form opposing walls of the compartments 3. Although four compartments have been shown in FIG. 1, the number of compartments will be chosen to suit a particular application. Each compartment 3 is of a size that is sufficient to accommodate a nuclear fuel element.

Figure 2:
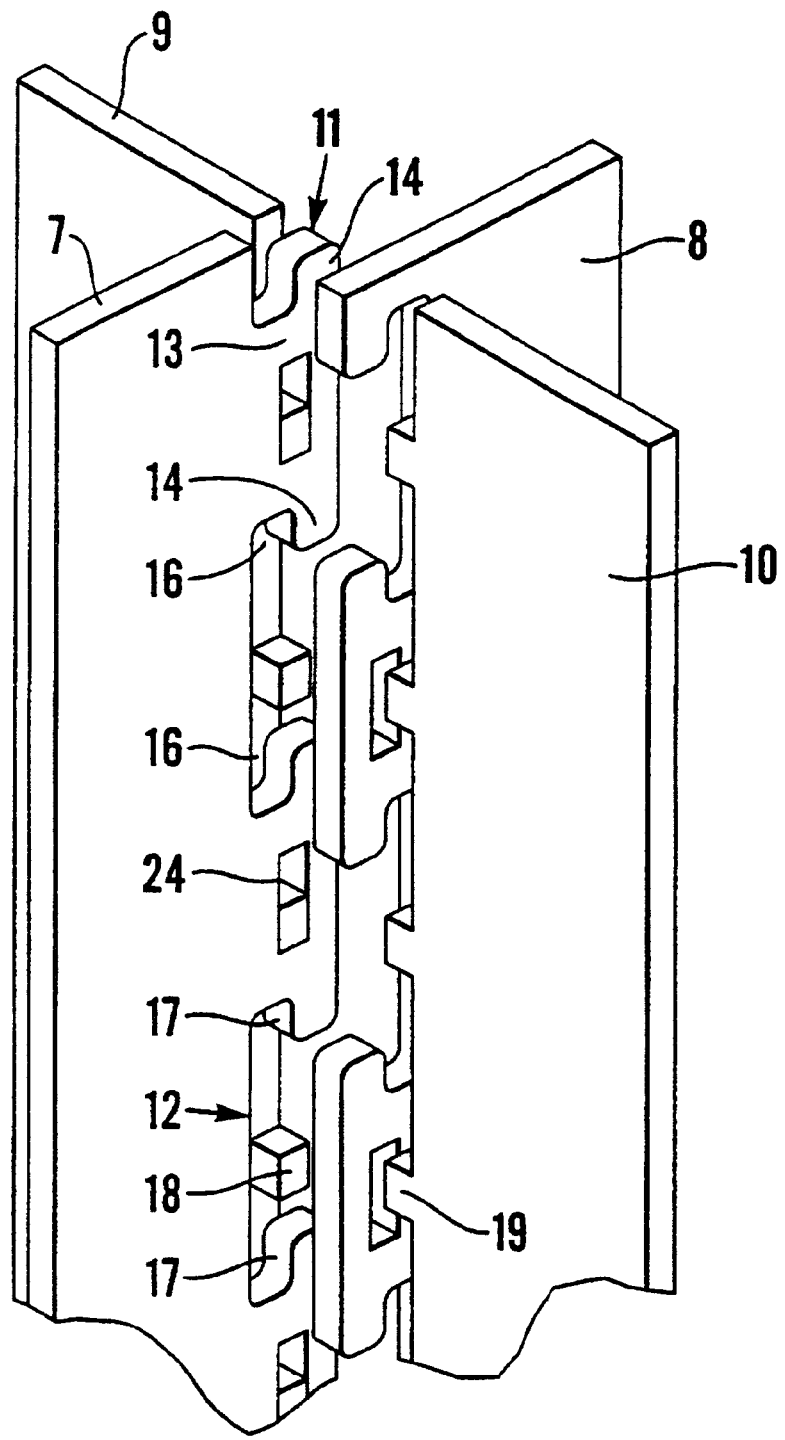
FIG. 2 is an exploded isometric view of an interlocking joint for the interconnection of the plates forming the compartments shown in FIG. 1.
Figure 3:
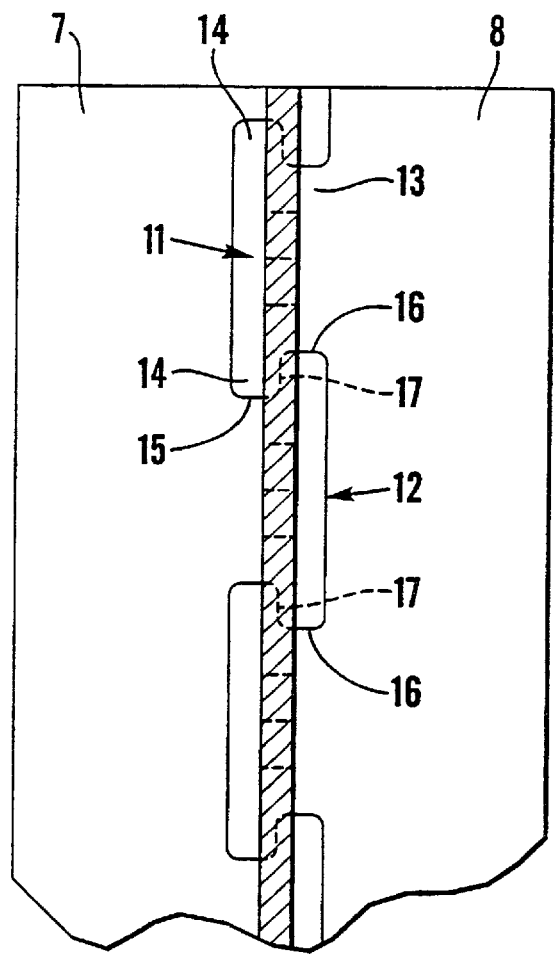
FIGS. 3 and 4 are elevations showing the interconnection of plates for the interlocking joint shown in FIG. 2.
Figure 4:
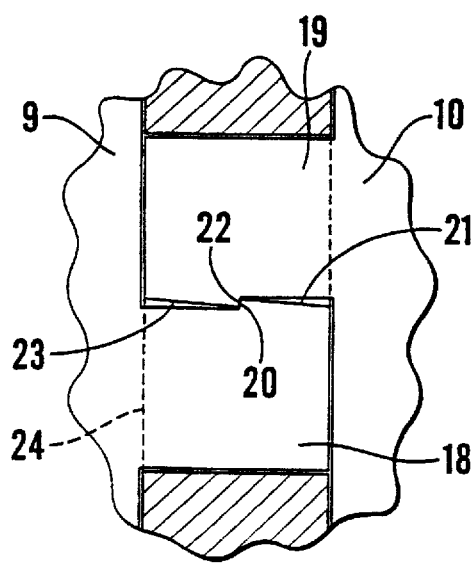

Referring now to FIGS. 2, 3 and 4, the first set of plates 5 comprises a plurality of interconnected individual plates, two of which plates 7, 8 are shown. Similarly, the second set of plates 6 comprises a plurality of individual plates, two of which plates 9, 10 are shown. A joint at a typical cross junction of the two sets of plates if shown in FIGS. 2, 3 and 4.

The, plates 7, 8 of the first set are formed with a series of alternating projections 11 and recesses 12 along the longitudinal edge, the projections and recesses being arranged at a regular pitch or spacing. Each projection 11 is generally T-shaped defined by a first portion 13 extending from the longitudinal edge and two arm portions 14. The arm portions 14 extend laterally from an end of the first portion 13 at each side thereof. Each recess 12 is formed to correspond in shape to the T-shaped projections 11. An initial passage 15 of the recess 12 extends from the longitudinal edge. At an end of the passage 15 are two laterally extending side portions 16 which are formed so as to define two shoulders 17 behind the arm portions 14 of a projection 11.

Along the longitudinal edges of the plates 8 of the first set is a series of alternating projections 11 and recesses 12 which are formed in a manner similar to those on plates 7. When the plates 7 and 8 are joined together the projections 11 on one of the plates interlock with the recesses 12 on the other plate. The shoulders 17 are engaged by the arm portions 14 which thereby serve as retaining means. Separation of the plates 7 and 8 in a direction normal to the longitudinal edges along the plane containing the first set is not possible.

Formed along the longitudinal edges of the plate 9 of the second set 6 is a series of projections in the form of tenons 18. The tenons 18 project from the edge by a distance substantially equal to the thickness of the plates 7, 8 of the first set. Similarly, a series of tenons 19 is formed along the longitudinal edges of the plates 10 of the second set 6.

As seen in FIG. 4, at a mid-position of the upper surface of the tenon 18 is stepped to form a latch 20. An upwardly and rearwardly inclined portion 21 of the upper surface extends to the latch 20 from a leading end of the tenon 18.

A lower surface of the tenon 19 is also stepped at a mid-portion thereof to form a latch 22. A downwardly and rearwardly inclined portion 23 of the lower surface extends from a leading end of the tenon 19 to the latch 22. The tenons 18, 19 are received in rectangular slots 24 formed in the plates 7, 8 of the first set, each slot being located within the periphery defining a projection 11.

To assemble the compartments 3, the plates 7, 8 of the first set 5 are joined together by interlocking the projections 11 and recesses 12 along mutually adjacent longitudinal edges of the plates. Several plates 7, 8 may be joined together in this manner to obtain the desired width of plates of the first set 5. An end plate 25 (see FIG. 1) is provided at each end of the plates 7, 8. Along a longitudinal edge of each end plate 25 is a series of projections 11 and recesses 12 in the form as provided on the end plates 7, 8. These projections and recesses interlock with complementary projections and recesses in an adjacent plate 7, 8 of the first set. Rectangular slots 24 are provided within the peripheries defining the projections 11.

After assembling the plates 6, 7 of the first set 5, the plates 8, 9 of the second set 6 are interlocked therewith. This is effected by inserting the tenons 18 of a plate 9, and tenons of a plate 8 into the slots 24. The leading end of the tenons 18, 19 are inserted from opposite sides of the plates 7, 8 so that the inclined surfaces 21, 23 slide along one another. The plates 7, 8 are forced together so that latches 20, 22 become interengaged. The latches 20, 22 are positioned so that the plates 8, 9 are clamped against the plates 6, 7 thereby forming a strong interlocking joint at the cross junction of the four plates. An end plate 26 (see FIG. 1) is provided at each end of the plates 9, 10 of the second set 6. Along the longitudinal edge of the plate 26 is a series of tenons 18 which interengage with tenons 19 on a mating plate 10 within a slot 24.

A container 31 incorporating an alternative type of interlocking joint according to the present invention is illustrated in FIGS. 5 to 8. The container 31 comprises an elongate cylindrical casing 32 within which is housed a plurality of compartments 33. The compartments 33 are located within the casing 32 by a plurality of baffle plates 34 positioned at intervals along the container.

The compartments 33 are of rectangular cross section and are formed by two sets of elongate plates 35, 36. A first set of plates 35 extends perpendicularly with respect to a second set of plates 36 so as to form opposing walls of the compartments 33. Seven compartments 33 have been illustrated in FIG. 5 by way of example, but the number of compartments will be selected to suit a particular application.

Figure 6:
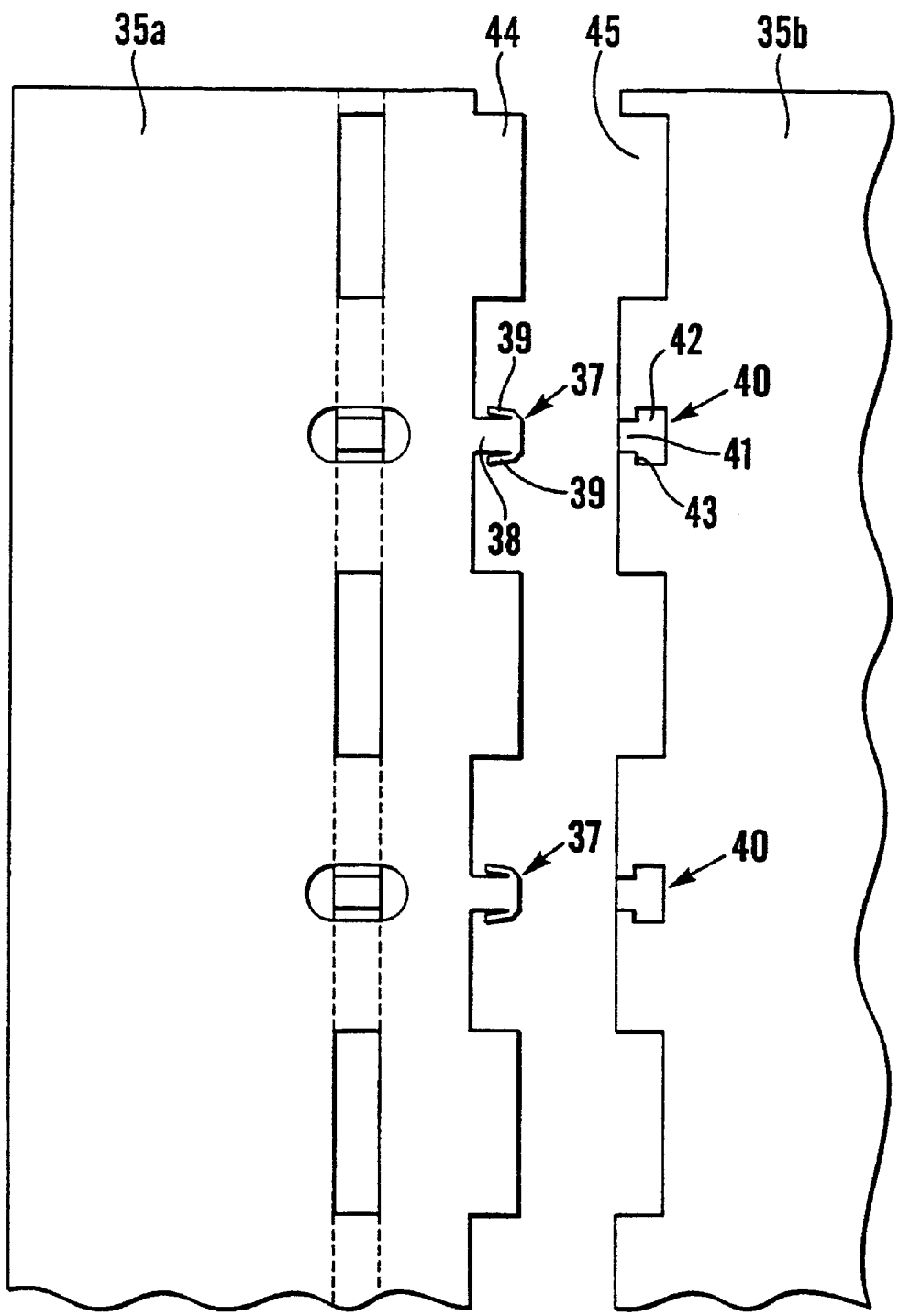
FIGS. 6, 7 and 8 are elevations showing interlocking joints for the interconnection of the plates forming the compartments shown in FIG. 5.

FIG. 6 illustrates a typical interlocking joint for connecting individual plates in the first set of plates 35 to obtain a wider plate to extend across the container. A plate 35a of the first set has a series of projections 37 arranged at a regular pitch or spacing along a longitudinal edge of the plate. Each projection 37 comprises a first portion 38 extending forwardly from the longitudinal edge of the plate. Two arm portions in the form of resilient tabs 39 extends rearwardly and outwardly from an end of the first portion 38.

A series of recesses 40 is provided on the longitudinal edge of the mating plate 35b. The recesses 40 are arranged at spaced intervals so as to receive the projections 37. Each recess 40 has a first passage region 41 extending into an enlarged region 42. A shoulder 43 is formed at the junction of the first passage region 41 and the enlarged region 42. When assembling the plates 35a, 35b, the projections 37 are forced through the first passage region 41. The dimensions of the passage region 41 are such as to cause the two resilient tabs 39 to be deflected inwardly.

When the projections 37 are completely located in the recesses 40, the enlarged region 42 allows the resilient tabs 39 to move towards their undeflected positions. The free ends of the tabs 39 locate behind the shoulders 43 which act to retain the projections 37 thereby interlocking the plates 35a, 35b.

The strength of the interlocking joint is enhanced by the provision of a series of rectangular extensions 44 along the longitudinal edge of plate 35a which mate with a series of correspondingly shaped rectangular cavities 45 formed in the longitudinal edge of the plate 35b.

Figure 7:
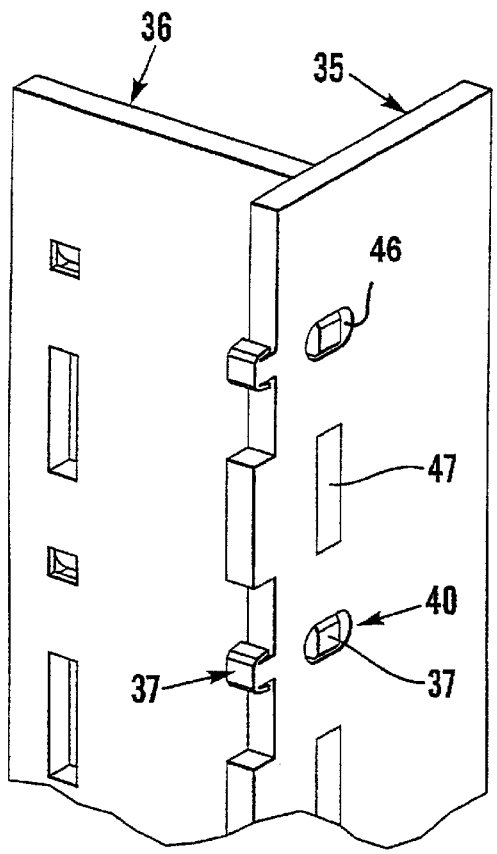
Figure 8:
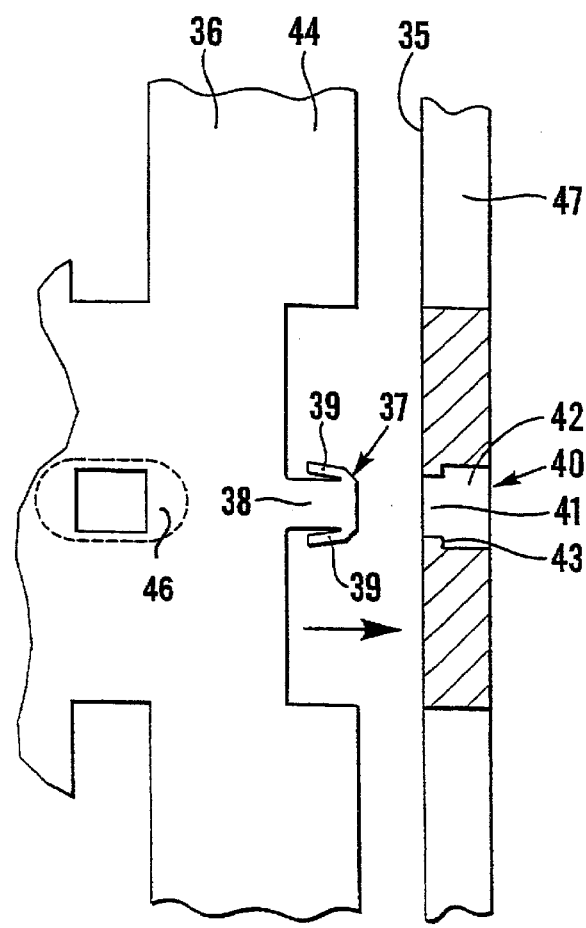

A typical interlocking joint for interconnecting plates at a T-junction of the first and second set of plates 35, 36 is shown in FIGS. 7 and 8. A series of projections 37 is arranged at a regular pitch along the longitudinal edge of the plate 36. These projections 37 correspond in form to the projections 37 described with reference to the joint shown in FIG. 6.

A series of recesses 40 is formed in the plate 35 which extends perpendicularly with respect to the plate 36. Again, the recesses 40 are formed in a similar manner to those described with reference to the joint shown in FIG. 6. In this embodiment, however, the enlarged region 46 is in the form of a slot having semi-circular ends. A series of rectangular extensions 44 is formed along the longitudinal edge of the plate 36. These extensions are received in rectangular slots 47 formed in the plate 36. The plates 35, 36 are interlocked by forcing the projections 37 into the recesses 40 so that the resilient tabs 39 locate behind the shoulders 43 in the manner previously described.

What is claimed is:

1. A container for the storage and transport of nuclear fuel elements comprising a plurality of elongate compartments for receiving the nuclear fuel elements, the compartments being defined by a first set of plates having a common plane intersecting with a second set of plates, the first set of plates extending perpendicularly with respect to the second set of plates to define compartments having a rectangular cross section, wherein the plates include an interlocking joint, the interlocking joint comprising at least one projection provided on one plate of one set and a recess formed in the other plate of the same set, and wherein a retaining portion is provided in the recess for engagement by the projection so as to interlock the plates to prevent separation of the plates by relative movement in their common plane.

2. A container according to claim 1, wherein the plates in the first set are interconnected by an interlocking joint comprising a plurality of projections spaced along a longitudinal edge of one of the plates and a plurality of recesses spaced along a longitudinal edge of the other plate.

3. A container according to claim 2, wherein the projection comprises a first portion extending forwardly from the longitudinal edge of the said one of the plates and an arm portion extending laterally from an end of the first portion, and wherein the arm portion engages with the retaining portion in the recess.

4. A container according to claim 3, wherein an arm portion extends from each side of the first portion, the recess having two retaining portions, each of which is engaged by an arm portion.

5. A container according to claim 4, wherein the first portion and each arm portion may define a substantially T-shaped projection and wherein the recess is correspondingly substantially T-shaped.

6. A container according to claim 5, wherein each arm portion may be formed by a deflectable tab extending rearwardly and outwardly from an end of the first portion, the tabs being deflected inwardly as the projection is pushed into the recess, the tabs tending to resume their undeflected positions when the projection is located in the recess.

7. A container according to claim 6, wherein the recess has a first passage region extending into an enlarged region, the junction of the first passage region and the enlarged region defining the retaining portion.

8. A container according to claim 6, wherein at an intersection of the first and second set of plates the recess is in a plate of the second set.

9. A container according to claim 1, wherein at an intersection of the first and second set of plates at least one tenon projects from each of the mutually facing longitudinal edges of the plates of the second set, the tenons extending into a slot provided in the plate of the first set.

10. A container according to claim 9, wherein a tenon projects from each of the mutually facing longitudinal edges of the plates of the second set, the tenons being received by the same slot.

11. A container according to claim 9, wherein the tenons on each of the longitudinal edges are provided with interengaging latch portions.

12. A container according to claim 1, wherein the recess has a first passage region extending into an enlarged region, and wherein a junction of the first passage region and the enlarged region defines the retaining portion.

13. A container according to claim 12, wherein at an intersection of the first and second set of plates the recess is in a plate of the second set.

14. A container according to claim 2, wherein at an intersection of the first and second set of plates at least one tenon projects from each of the mutually facing longitudinal edges of the plates of the second set, the tenons extending into a slot provided in the plate of the first set.

15. A container according to claim 14, wherein a tenon projects from each of the mutually facing longitudinal edges of the plates of the second set, the tenons being received by the same slot.

16. A container according to claim 14, wherein the tenons on each of the longitudinal edges are provided with interengaging latch portions.

17. A container according to claim 15, wherein the tenons on each of the longitudinal edges are provided with interengaging latch portions.

18. A container according to claim 3, wherein at an intersection of the first and second set of plates at least one tenon projects from each of the mutually facing longitudinal edges of the plates of the second set, the tenons extending into a slot provided in the plate of the first set.

19. A container according to claim 18, wherein a tenon projects from each of the mutually facing longitudinal edges of the plates of the second set, the tenons being received by the same slot.

20. A container according to claim 18, wherein the tenons on each of the longitudinal edges are provided with interengaging latch portions.

21. A container according to claim 19, wherein the tenons on each of the longitudinal edges are provided with interengaging latch portions.

22. A container according to claim 4, wherein at an intersection of the first and second set of plates at least one tenon projects from each of the mutually facing longitudinal edges of the plates of the second set, the tenons extending into a slot provided in the plate of the first set.

23. A container according to claim 22, wherein a tenon projects from each of the mutually facing longitudinal edges of the plates of the second set, the tenons being received by the same slot.

24. A container according to claim 22, wherein the tenons on each of the longitudinal edges are provided with interengaging latch portions.

25. A container according to claim 23, wherein the tenons on each of the longitudinal edges are provided with interengaging latch portions.

26. A container according to claim 5, wherein at an intersection of the first and second set of plates at least one tenon projects from each of the mutually facing longitudinal edges of the plates of the second set, the tenons extending into a slot provided in the plate of the first set.

27. A container according to claim 26, wherein a tenon projects from each of the mutually facing longitudinal edges of the plates of the second set, the tenons being received by the same slot.

28. A container according to claim 26, wherein the tenons on each of the longitudinal edges are provided with interengaging latch portions.

29. A container according to claim 27, wherein the tenons on each of the longitudinal edges are provided with interengaging latch portions.

30. A container according to claim 10, wherein the tenons on each of the longitudinal edges are provided with interengaging latch portions.

* * * * *